United States Patent Office 3,203,863
Patented Aug. 31, 1965

3,203,863
PROCESS FOR PRODUCING PROTOANEMONIN PREPARATION
Akira Sakuma, Kamakura-shi, Kanagawa-ken, and Shiro Hirano, Tokyo, Japan, assignors to Lion Hamigaki Kabushiki Kaisha, Tokyo, Japan
No Drawing. Filed Jan. 22, 1963, Ser. No. 253,153
Claims priority, application Japan, Feb. 5, 1962, 37/4,351
2 Claims. (Cl. 167—65)

This invention relates to a process for the production of a medical preparation containing protoanemonin as an effective ingredient. This process is specially prepared so as to liberate protoanemonin only in use.

More particularly, it is concerned with a protoanemonin preparation in which the protoanemonin is present at effective proportion as a state of stable solution thereof.

It has been thus far known that protoanemonin exhibits various interesting biological activities such as antibacterial, local anesthetic, erythema producing effects and the like.

As is reported by Asahina (Acta Phytochim, Japan, vol. 1, pp. 1–42 (1922)), who discovered it, protoanemonin is γ-oxyvinyl acrylic acid lactone which is represented by the structural formula;

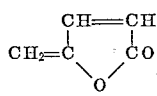

Protoanemonin is a colorless oil melting at —5° C. having a pungent odor with lachrymatory and reddening-blistering influences to the skin. It is a most unstable compound which readily polymerizes into anemonin and into higher polymers. According to the E. Shaw (J. Am. Chem. Soc., vol. 68, pp. 2510–2513 (1946)) and A. Sakuma's (J. Pharm. Soc. Jap., vol. 73, pp. 1137–1139 (1953)) reports, it can be stabilized to a certain extent by dissolving newly prepared protoanemonin immediately in water or in propylene glycol and adding thereto an antioxidant to make its solution have comparatively improved stability. However, even if it has been stabilized, such solution should not be kept at room temperature because some hydrolysis and polymerization takes place as the period of storage elapses, so that it is always necessary to preserve such solution in a freezing chamber.

Thus, it has been a matter of great difficulty to utilize protoanemonin as a preparation though it has many attractive biological activities.

The object of this invention is to provide a stable protoanemonin solution which can be easily prepared when it is to be applied.

Another object of this invention is to obtain a protoanemonin solution having a controlled pH value suited for applying to a living body.

Still another object of this invention is to obtain a biologically active preparation in which protoanemonin is produced at appropriate proportion from ranunculin to give such biological activities as erythema producing, antibacterial, local anesthetic, and so on, by administrating.

It is now accomplished by compounding together ranunculin extracted from Ranunculaceae, with a basic solution in the presence of a solid buffer or a solid buffer coated with a water-soluble high molecular weight compound to form an effective amount of protoanemonin by the first reaction of ranunculin with the base, and to stabilize the resultant protoanemonin in situ by the second neutralization reaction of excess alkali by the buffer.

Ranunculin is a glycoside of protoanemonin melting at 143° C. found in a plant of Ranunculaceae by R. Hill (Biochem. J., vol. 49, pp. 332–335 (1951)) who suggested its structural formula as

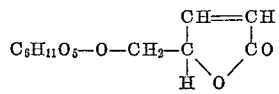

and reported that when steam-distilling with sodium acetate it gave protoanemonin.

Ranunculin is a stable compound but has no antibacterial activity compared with protoanemonin which shows effective biological activities as described before.

In accordance with this invention, ranunculin is extracted from a plant belonging to Ranunculaceae at the yield of from 0.7 to 1%. It does not form protoanemonin by the reaction with water or acid when the pH is under 3, but it is converted to protoanemonin by the action of alkali as R. Hill (noted above) and Nils Hellström's reports (Hellström's publication being reported in Kgl. Lantbruks-Hogsk. Ann., vol. 22, pp. 297–316 (1956); vol. 25, pp. 171–184 (1959); vol. 28, pp. 17–26 (1956) and pp. 165–174 (1962); Nature, vol. 179, pp. 589–590 (1957); Acta Agri. Scand., vol. 8, pp. 285–292 (1958)). However, the resulted protoanemonin rapidly decomposes to acetoacylic acid when the pH of the solution is high. It has now been found that the 0.1–0.6% solution of protoanemonin formed by the reaction of ranunculin with a basic solution can be maintained in a stable state having an effective concentration by the preliminary addition of a solid buffer or solid buffer coated with a water-soluble high molecular weight compound without resulting in decomposition thereof, and thereby giving a substantially neutral preparation which can be applied to the body.

The basic agent which may be used for the practice of this invention includes: alkali metal salts of various phosphorus acids such as tertiary sodium phosphate and such alkali metal carbonates as sodium carbonate.

The primary solid buffer to be employed in this invention should have buffer action when it is dissolved in water together with the above basic agent. Preferred agents are; acidic salts such as primary potassium phosphate, primary sodium sulfate; and crystals of organic acids such as crotonic acid, acetoacrylic acid, senecioic acid, sorbic acid, palmitic acid, stearic acid, dehydroacetic acid, lauroyl sarcosin, phthalic acid, salicylic acid and the like.

This invention also contemplates the addition of an antioxidant to the ranunculin preparation hereinbefore described. Typical antioxidants include propyl gallate, isoamyl gallate, ethyl protocatechuate, butyl hydroxy anisole, 2,2' methylene bis (4-methyl-6-tertiary butyl phenol), 2,6-di-tertiary butyl hydroxy toluene, nordihydroguaiaclic acid, 3,4-bis (3,4-dihydroxyphenyl)-n-hexane, 3,4-bis-(3-hydroxy-4-ethoxyphenyl)-n-hexane etc.

The buffer agent to be used in this invention may be coated beforehand with a material, for example, with a water soluble high molecular weight compounds such as polyvinyl alcohol, polyethylene glycol or the like, in order to delay the neutralization reaction of alkali by the buffer and to afford a time delay for the reaction time between the ranunculin and basic solution which products protoanemonin.

The amuont of the basic agent added to react with ranunculin should be enough to be able to form an effective proportion of protoanemonin in the solution before the neutralization reaction by the solid buffer terminates. The ratio of the basic agent to the solid buffer to be employed is preferably adjusted such that the pH of the solution is maintained substantially neutral when all reactions have terminated.

The quantitative analysis for the protoanemonin formed in the preparation may be carried out using ultra-violet absorption spectrum method.

Ranunculin (RC), protoanemonin (PA) and acetoacrylic acid (AA) formed by the hydrolysis of protoanemonin have maximum absorptions in pure water at 205 mμ, 260 mμ and 220 mμ respectively, and the $E_{1\ cm.}^{1\%}$ values are shown in following Table 1.

TABLE 1.—$E_{1\ cm.}^{1\%}$ VALUE OF RC (M.P. 143°), AA (M.P. 125.5° AND PA (M.P. −5° C.)

|    | 205 mμ | 220 mμ | 260 mμ |
|----|--------|--------|--------|
| RC | 360    | 190    | 0      |
| AA |        | 1,310  | 150    |
| PA |        | 250    | 1,600 (σ=20) |

The relation between the absorption coefficient D and the concentration is in a linear line within the range of 0 to 0.5 mg./100 cc. with regard to PA at 260 mμ.

As is shown Table 1, RC has no absorption at 260 mμ, it is able to know the concentration of PA from D 260 mμ when the ingredients are consisted of RC and PA. AA shows a slight absorption at 260 mμ, however, it may be ignored because it occupies only 9% at D 260 mμ when its concentration is equal to that of PA in the solution to be analyzed. The glucose, which forms at the same time with the reaction to produce PA from RC, has no absorption at 260 mμ under condition of this invention. Therefore, the proportion of PA in mg. contained in 100 cc. of the solution to be measured is given by the equation:

$$C = \frac{D260\ m\mu}{1600} \times 1000\ (\text{experimental error, } \sigma = 1\%).$$

The authentic sample of protoanemonin employed for this quantitative analysis was prepared by heating acetyl acetoacrylic acid (M.P. 28.5°) together with acetic anhydride in glacial acetic acid using strong sulfuric acid as the catalyst and distilled under reduced pressure of 0.5 mm. Hg within a short time to give a colorless oil having a constant boiling point within the range between 30° and 36° C., and which crystallize into needle crystal if cooled with a freezing agent. It is then dissolved in pure water containing a small amount of an antioxidant and is measured to obtain ultraviolet absorption spectra at various concentrations and to confirm E value.

The invention will be more fully described by following examples.

*Example 1*

50 mg. ranunculin, 0.1 mg. propyl gallate and 8 mg. of the crystal of acetoacrylic acid were mixed and dissolved into 1.0 cc. of 0.05 M aqueous solution of tertiary sodium phosphate. The resulted solution could now be administered for a biological purpose. The content of protoanemonin three minutes after the preparation was 0.21%, and the pH was 6.8. No substantial change in either of these values was noticed after leaving the solution at room temperature for 15, 30, 60 minutes and for even 17 hours. (D260 mμ=0.130 and D220 mμ=0.510 for the solution diluted to 1000 times, reference solution used for the analysis was the same composition and dilution as above solution except ranunculin is omitted therefrom.)

*Example 2*

1.0 cc. of 0.05 M aqueous solution of tertiary sodium phosphate was added to a mixture comprosing 50 mg. ranunculin, 0.1 mg. propyl gallate and 8.5 mg. of the crystal of senecioic acid. The solution obtained was suitable for administration as an external medicine. The content of protoanemonin 10 minutes from the addition of the sodium phosphate was 0.24%, and the pH was 6.6. No appreciable change was observed after three hours. (D260 mμ=0.390 max., D230 mμ=0.245, D220 mμ=0.600 at the solution diluted to 1000 times. The reference solution was the same as in Example 1.)

*Example 3*

1.0 cc. of 0.05 M tertiary sodium phosphate aqueous solution was added to a mixture comprising 50 mg. ranunculin, 0.1 mg. propyl gallate and 5 mg. of the crystal of acetoacrylic acid. The resulted solution was suitable for use as a medical preparation. The protonamonin content after 2, 12, 30 and 80 minutes were 0.37, 0.40, 0.44, 0.32% respectively. (D260 mμ=0.583 max., D230 mμ=0.065 and D220 mμ=0.300 as to the 1000 times dilute solution after two minutes; the reference solution used was the same as in Example 1.)

*Example 4*

To the mixture comprising 20 mg. ranunculin and 4 mg. primary potassium phosphate treated with 10% PEG-4000, there was added 0.5 cc. of 0.05 M tertiary sodium phosphate solution. The solution obtained was suitable for use as a preparation for biological purposes. The protanemonin content and the pH of the solution after two minutes were 0.10% and 7.6 respectively. There was no degradation of these values observed after leaving the solution for ten minutes. (D260 mμ=0.150, D240 mμ=0.085, D230 mμ=0.142 and D220 mμ=0.520 as to the solution diluted to 1000 times after two minutes.)

*Example 5*

The following protoanemonin-RL was prepared. This protoanemonin-RL is consisted of two ampoules (R and L). Open L-ampoule and add 1.0 cc. of the solution of L into an opened R-ampoule with gentle shake in room temperature. Within 3 minutes, the alkaline red color of phenolphthalein vanishes indicating that protoanemonin liberation is completed. All the organic acid previously fused on the bottom of R-ampoule by PEG-4000 are then dissolved giving a clear neutral solution of pH 6.8–7.0. Since careful consideration was given to choose the proper antioxidants, the solution is stable at least for 7 days at room temperature.

Contents—

| R-ampoule: | Mg. |
|---|---|
| Ranunculin | 50 |
| PEG-4000 | 6 |
| Acetoacrylic acid crystal | 6 |
| Propylgallate | 0.2 |
| Phenolphthalein | 0.1 |

L-amopule:

About 1.1 cc. of 0.05 M tertiary sodium phosphate 1 cc. of the final clear solution contains the following substances: protoanemonin 4.0 mg. (σ=0.4), glucose, unreacted ranunculin and other substances. D260 mμ was 0.320, as to the solution diluted 2000 times. The reference solution was the same as in Example 1. The amount of protoanemonin in this solution was also polarographically determined and distinguished from acetoacrylic acid. The half wave potential of protoanemonin was 14.6 v. at pH 3-McIlvaine-buffer and that of acetoacrylic acid was 7.7 v. According to the increase of the wave height when the standard solution was added, the amount of protoanemonin determined was approximately equal to the result of the ultra-violet method and the amount of acetoacrylic acid determined was almost equal to the initial amount in the R ampoule.

What we claim is:

1. A process for preparing stabilized aqueous protoanemonin solution which comprises reacting ranunculin with a basic agent in the presence of water and in the presence of a solid buffer selected from the group consisting of primary potassium phosphate, primary sodium sulfate, crystals of crotonic acid, acetoacrylic acid, senecioic acid, sorbic acid, palmitic acid, stearic acid, dehydroacetic acid, lauroyl sarcosin, phthalic acid and salicylic acid.

2. The process of claim 1 wherein said basic agent is selected from the group consisting of tertiary sodium phosphate and sodium carbonate.

References Cited by the Examiner

Protoanemonin Stabilization References, located in Chem. Abstracts: C.A. 48, No. 12070F (1954); C.A. 49, No. 10586B (1955); C.A. 53, 1645D (1959); C.A. 54, No. 7799B (1960).

LEWIS GOTTS, *Primary Examiner.*

FRANK CACCIAPAGLIA, Jr., *Examiner.*